United States Patent
Ohkawara et al.

(10) Patent No.: US 9,083,015 B2
(45) Date of Patent: Jul. 14, 2015

(54) FUEL CELL SYSTEM

(75) Inventors: Hiroki Ohkawara, Okazaki (JP); Shin Iwata, Kobe (JP); Susumu Takami, Osaka (JP); Minoru Suzuki, Suita (JP)

(73) Assignees: AISIN SEIKI KABUSHIKI KAISHA, Kariya-shi (JP); OSAKA GAS CO., LTD., Osaka-shi (JP)

( * ) Notice: Subject to any disclaimer, the term of this patent is extended or adjusted under 35 U.S.C. 154(b) by 690 days.

(21) Appl. No.: 13/368,727

(22) Filed: Feb. 8, 2012

(65) Prior Publication Data

US 2012/0208098 A1    Aug. 16, 2012

(30) Foreign Application Priority Data

Feb. 10, 2011 (JP) ................. 2011-026644

(51) Int. Cl.
*H01M 8/06* (2006.01)
*H01M 8/04* (2006.01)
(Continued)

(52) U.S. Cl.
CPC ........... *H01M 8/04089* (2013.01); *B01D 53/00* (2013.01); *C10G 25/00* (2013.01); *H01M 8/04082* (2013.01); *H01M 8/06* (2013.01); *H01M 8/0618* (2013.01); *H01M 8/0662* (2013.01); *H01M 8/0675* (2013.01); *C10G 2300/202* (2013.01); *H01M 8/04* (2013.01);
(Continued)

(58) Field of Classification Search
CPC ............. H01M 8/04; H01M 8/04082; H01M 8/04067; H01M 8/06; H01M 8/0618; H01M 8/0662; H01M 8/0675
USPC ........................................ 429/410
See application file for complete search history.

(56) References Cited

U.S. PATENT DOCUMENTS

2003/0192609 A1* 10/2003 Enerson ................. 137/899
2005/0132649 A1*  6/2005 Tamura et al. ........... 48/197 R
(Continued)

FOREIGN PATENT DOCUMENTS

JP    05-114414        5/1993
JP    09-320622 A    12/1997
(Continued)

OTHER PUBLICATIONS

Extended European Search Report Issued Mar. 28, 2013 in Patent Application No. 12154631.1.
(Continued)

*Primary Examiner* — Jonathan G Leong
*Assistant Examiner* — James Erwin
(74) *Attorney, Agent, or Firm* — Oblon, McClelland, Maier & Neustadt, L.L.P.

(57) ABSTRACT

A fuel cell system includes a source gas passage including a first desulfurizer that has a desulfurization performance relative to a source gas having a relatively higher dew point, and a second desulfurizer that has the desulfurization performance relative to a source gas having a relatively lower dew point and the source gas having the relatively higher dew point. The desulfurization performance of the second desulfurizer relative to the source gas having the relatively higher dew point is lower than the desulfurization performance of the second desulfurizer relative to the source gas having the relatively lower dew point. The first desulfurizer, the second desulfurizer, and a flowmeter are arranged at the source gas passage in the aforementioned order from an upstream side to a downstream side of the source gas passage in a flow direction of the source gas.

7 Claims, 8 Drawing Sheets

(51) Int. Cl.
   *B01D 53/00* (2006.01)
   *C10G 25/00* (2006.01)
   *H01M 8/12* (2006.01)

(52) U.S. Cl.
   CPC ........ *H01M 2008/1293* (2013.01); *Y02E 60/50* (2013.01); *Y02E 60/525* (2013.01)

(56) References Cited

U.S. PATENT DOCUMENTS

2006/0110305 A1* 5/2006 Van De Graaf .......... 423/244.04
2006/0199051 A1* 9/2006 Bai et al. .......................... 429/17

FOREIGN PATENT DOCUMENTS

| | | |
|---|---|---|
| JP | 2006-111766 | 4/2006 |
| JP | 2006-260874 A | 9/2006 |
| JP | 2006-265480 | 10/2006 |
| JP | 2006-309982 A | 11/2006 |
| JP | 2009-32406 A | 2/2009 |
| JP | 2009-249203 A | 10/2009 |
| WO | WO 2007/020800 A1 | 2/2007 |

OTHER PUBLICATIONS

Office Action issued Jan. 29, 2013, in Japanese Patent Application No. 2011-026644 with English translation.

* cited by examiner

F I G. 10
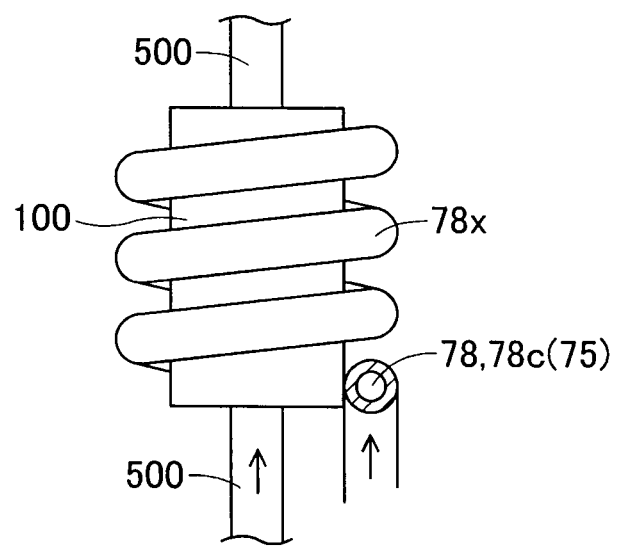

FUEL CELL SYSTEM

CROSS REFERENCE TO RELATED APPLICATIONS

This application is based on and claims priority under 35 U.S.C. §119 to Japanese Patent Application 2011-026644, filed on Feb. 10, 2011, the entire content of which is incorporated herein by reference.

TECHNICAL FIELD

This disclosure generally relates to a fuel cell system.

BACKGROUND DISCUSSION

JP2006-111766A (hereinafter referred to as Reference 1) discloses a desulfurization unit for liquefied petroleum gas (LPG). The desulfurization unit includes a first desulfurizer operating in a normal temperature and a second desulfurizer operating in a high temperature (greater than 100° C.). The first desulfurizer is arranged at an upstream side in view of a flow direction of a source gas. The first desulfurizer is provided for a sulfur compound (tertiary-butylmercaptan (TBM) or dimethyl sulfide (DMS), for example) that serves as an odorant used in the source gas and that is relatively easy to be desulfurized. The second desulfurizer is arranged at a downstream side relative to the first desulfurizer. The second desulfurizer is provided for a sulfur compound specifically included in LPG (carbonyl sulfide (CO), for example). Metal oxide such as nickel is used in the second desulfurizer.

JP2006-265480A (hereinafter referred to as Reference 2) discloses a desulfurization unit basically including the same configuration as that of Reference 1. Specifically, according to Reference 2, the desulfurization unit includes a first desulfurizer operating in a normal temperature and a second desulfurizer operating in a high temperature. The second desulfurizer operates at 50° C. or greater. A desulfurizing agent accommodated in the second desulfurizer is provided for LPG. JP05-114414A (hereinafter referred to as Reference 3) includes a first desulfurizer operating in a normal temperature and a second desulfurizer operating in a high temperature, the second desulfurizer serving as a hydrogenation desulfurizer. That is, according to Reference 3, two desulfurization methods are combined so that the first desulfurizer covers an insufficiency of a desulfurization effect of the hydrogenation desulfurizer when a fuel cell system is started.

According to Reference 1, the second desulfurizer operating in the high temperature adsorbs the sulfur compound specifically included in LPG by metal oxide, for example, thereby removing the sulfur compound from LPG. The second desulfurizer is not intended to inhibit the desulfurizing agent from being damaged by water vapor included in the source gas. According to Reference 3, the second desulfurizer operating in the high temperature is intended to perform a hydrogenation desulfurization so that hydrogen is necessary for the desulfurization.

For example, the source gas corresponding to a city gas supplied by a gas company may include water vapor. The desulfurizing agent used in a normal temperature environment (which will be hereinafter referred to as a normal-temperature desulfurizing agent) is generally formed by a porous material such as zeolite and activated carbon. The normal-temperature desulfurizing agent adsorbs the sulfur compound in the source gas for the desulfurization. The normal-temperature desulfurizing agent formed by the porous material as a base material is inexpensive. However, in a case where a source gas having a high dew point and including a relatively large volume of water vapor is desulfurized by the normal-temperature desulfurizing agent, for example, the normal-temperature desulfurizing agent may preferentially adsorb the water vapor to the sulfur compound in the source gas. As a result, the adsorption capacity of the normal-temperature desulfurizing agent relative to the sulfur compound in the source gas may drastically decrease, therefore deteriorating the desulfurization effect of the normal-temperature desulfurizing agent (see FIG. 12).

A source gas having a low dew point and including a relatively small volume of water vapor is generally supplied to the industrial world. However, when a gas fitting work or a gas-pipe laying work is performed, for example, the water vapor included in the source gas increases; therefore, the dew point of the source gas may increase. At this time, the adsorption capacity of the desulfurizing agent relative to the sulfur compound in the source gas is reduced because of the water vapor included in the source gas having the high dew point. As a result, the desulfurization effect of the desulfurizing agent may decrease. In order to resolve such issue, a use amount of desulfurizing agent my excessively increase, which results in a cost increase and an enlargement of a fuel cell system. Further, a position and/or an improvement of a lifetime of a flowmeter, for example, is not considered or disclosed according to References 1 and 2.

A need thus exists for a fuel cell system which is not susceptible to the drawback mentioned above.

SUMMARY

According to an aspect of this disclosure, a fuel cell system includes a fuel cell including an anode and a cathode, a cathode gas passage supplying a cathode gas to the cathode of the fuel cell, a reformer reforming a source gas to generate an anode gas, a source gas passage including a gas supply source that supplies the source gas in a desulfurized state to the reformer, and an anode gas passage supplying the anode gas generated at the reformer to the anode of the fuel cell. The source gas passage includes a first desulfurizer arranged in a first environment having a relatively higher temperature, and the first desulfurizer includes a desulfurization performance relative to a source gas having a relatively higher dew point. The source gas passage includes a second desulfurizer arranged in a second environment having a relatively lower temperature than the first environment. The second desulfurizer includes the desulfurization performance relative to a source gas having a relatively lower dew point and the source gas having the relatively higher dew point. The desulfurization performance of the second desulfurizer relative to the source gas having the relatively higher dew point is lower than the desulfurization performance of the second desulfurizer relative to the source gas having the relatively lower dew point. The source gas passage includes a flowmeter measuring a flow volume of the source gas. The first desulfurizer, the second desulfurizer, and the flowmeter are arranged at the source gas passage in a state where an arrangement order is the first desulfurizer, the second desulfurizer, and the flowmeter from an upstream side to a downstream side of the source gas passage in a flow direction of the source gas.

BRIEF DESCRIPTION OF THE DRAWINGS

The foregoing and additional features and characteristics of this disclosure will become more apparent from the following detailed description considered with the reference to the accompanying drawings, wherein:

FIG. 10 is a schematic view of the first desulfurizer according to a ninth embodiment disclosed here;

DETAILED DESCRIPTION

Figure 1:
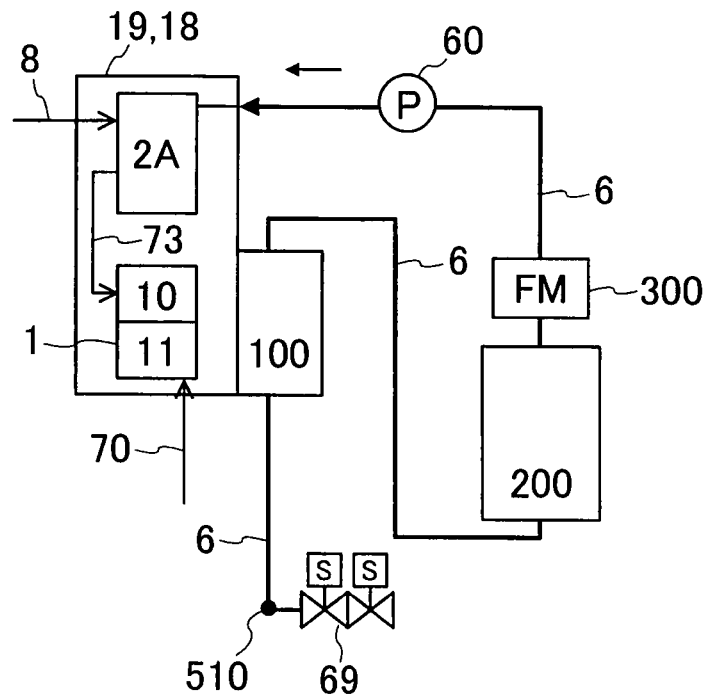
FIG. 1 is a schematic view of a fuel cell system according to a first embodiment disclosed here.

A base material of a desulfurizing agent accommodated in a first desulfurizer 100 and a second desulfurizer 200 is a porous material such as zeolite, metal-carrying zeolite where the metal is transition metal, for example, activated carbon, and metal oxide (alumina or ceria, for example). The desulfurizing agent may achieve an adsorption by a physical adsorption. However, in a case where metal such as transition metal is included in the desulfurizing agent, a chemical adsorption in addition to the physical adsorption may be also obtained. At least one of silver, copper, gold, rhodium, palladium, iridium, ruthenium, osmium, nickel, iron, chromium, and molybdenum, for example, is applied to the aforementioned metal. Further, an alloy including at least two of silver, copper, gold, rhodium, palladium, iridium, ruthenium, osmium, nickel, iron, chromium, and molybdenum, for example, is desirably applied to the aforementioned metal. A first desulfurizing agent accommodated in the first desulfurizer 100 may desirably include the aforementioned metal. Zeolite is a general term of aluminosilicate including pores in a crystal structure. Either natural zeolite or artificial zeolite is applicable. Not only sulfur compound (methyl melcaptan, dimethyl sulfide, or dimethyl disulfide, for example) but also water vapor and hydrocarbon (HC) contained in a source gas is physically desulfurized by the desulfurizing agent. An adsorption capacity of the desulfurizing agent changes depending on types of adsorbate such as the water vapor and a temperature of the desulfurizng agent. Specifically, the adsorption capacity of the desulfurizing agent is likely to be damaged by the water vapor in a normal temperature range. That is, the water vapor contained in the source gas is likely to be adsorbed to the desulfurizing agent and therefore an adsorption site provided at the desulfurizing agent is occupied by the water vapor, which makes the adsorption of the sulfur compound contained in the source gas difficult. At this time, among substances damaging or influencing the adsorption capacity of the desulfurizing agent relative to the sulfur compound, the water vapor contained in the source gas is considered to be most influencing the adsorption capacity. Thus, in a case where the source gas having a low dew point (for example, 0° C. or less, or −10° C. or less) is desulfurized by the desulfurizing agent, a water vapor content in the source gas is small so that the desulfurizing agent effectively exercises an ability to adsorb the sulfur compound contained in the source gas. On the other hand, in a case where the source gas having a high dew point flows and passes through the desulfurizing agent operating in a normal temperature environment, the volume of water vapor content in the source gas is large so that the desulfurizing agent is likely to be influenced by the water vapor. As a result, the ability of the desulfurizing agent to adsorb the sulfur compound decreases. However, according to the desulfurizing agent even having the aforementioned characteristics, the water vapor is unlikely to be adsorbed by the desulfurizing agent in a state where the desulfurizing agent is arranged in a high temperature environment (for example, in a temperature range from 40° C. or 50° C. to 200° C., 40° C., 50° C. and 200° C. being inclusive), thereby reducing the damage on the desulfurizing agent caused by the water vapor. The capacity to adsorb the sulfur compound by the desulfurizing agent is appropriately ensured. Consequently, the first desulfurizer 100 is appropriate and suitable for the source gas having the high dew point.

Figure 12:
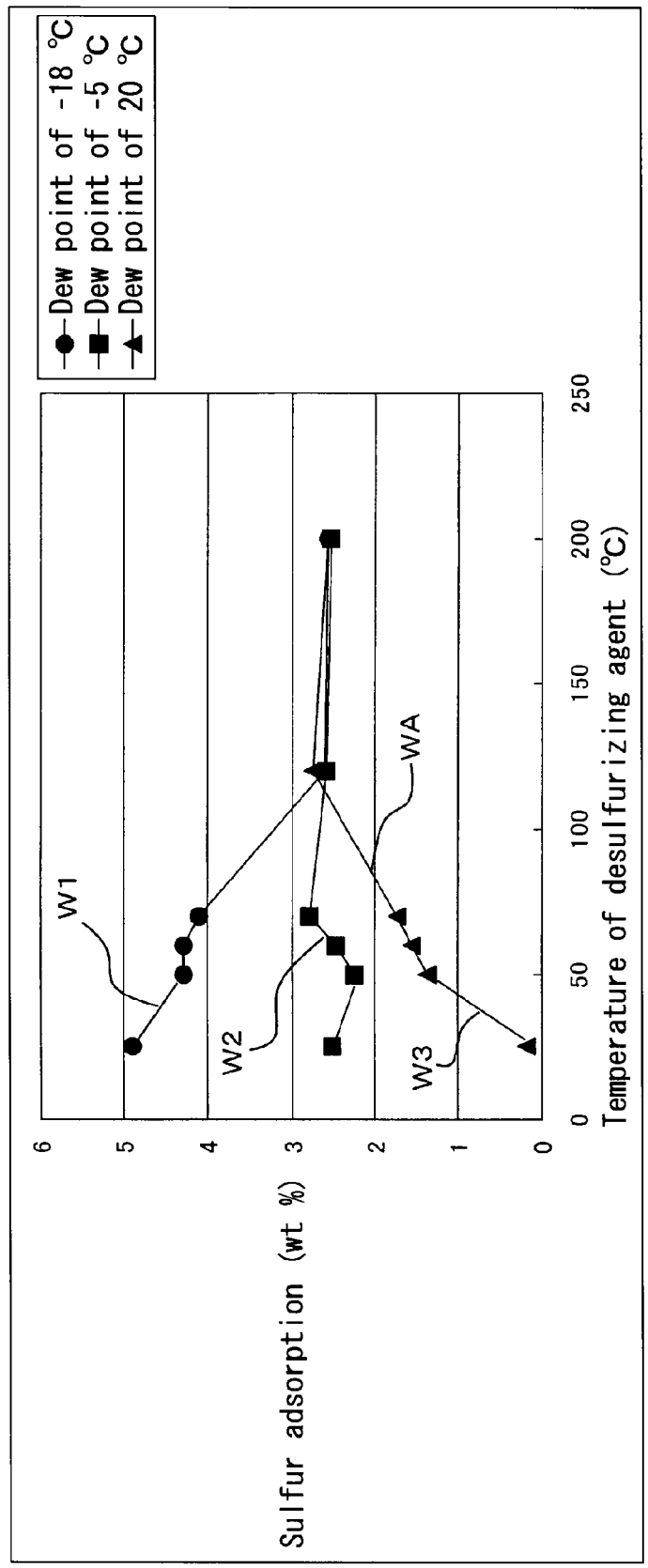
FIG. 12 a graph illustrating a relationship among a temperature of a desulfurizing agent, a sulfur adsorption capacity, and a dew point of a source gas.

FIG. 12 illustrates a relationship among the temperature of the zeolite-based desulfurizing agent, the sulfur adsorption capacity of the desulfurizing agent, and the dew point of the source gas desulfurized by the desulfurizing agent. The adsorption capacity of the desulfurzing agent is indicated by a weight percentage of sulfur adsorbed from the source gas by the desulfurizing agent relative to a weight of the desulfurizing agent. In FIG. 12, a characteristic line W1 is specified for the source gas having the dew point of −18° C. A characteristic line W2 is specified for the source gas having the dew point of −5° C. A characteristic line W3 is specified for the source gas having the dew point of +20° C. When the dew point of the source gas is −18° C. or −5° C. as illustrated by the characteristic lines W1 and W2, the water vapor content in the source gas is small. Thus, even when the temperature of the desulfurizing agent falls within a range from 20° C. to 120° C., the sulfur adsorption capacity of the desulfurizing agent is basically appropriately ensured. On the other hand, in a case where the dew point of the source gas is high such as +20° C. as illustrated by the characteristic line W3, the water vapor content in the source gas is large so that the sulfur adsorption capacity of the desulfurizing agent decreases because of the influence of the water vapor. When the temperature of the desulfurizing agent decreases to a range from 20° C. to 50° C. (inclusive of 20° C. and exclusive of 50° C.), the sulfur adsorption capacity of the desulfurizing agent is drastically reduced as illustrated by the characteristic line W3. According to the desulfurizing agent including the porous material as the base material and having the aforementioned characteristics, the sulfur adsorption capacity of the desulfurizing agent is still appropriately ensured even when the dew point of the source gas is +20° C. in a case where the desulfurizing agent is in the high temperature range from 50° C. to 120° C., as indicated by a portion WA of the characteristic line W3 in FIG. 12, though the adsorption capacity is slightly lower compared to the case where the dew point of the source gas is low. The above may also apply to a case where the desulfurizing agent is in the temperature range from 120° C. to 200° C. Even according to the desulfurizing agent having the characteristics where the sulfur adsorption capacity is reduced with the source gas having the high dew point and the large volume of water vapor, the sulfur adsorption capacity is appropriately maintained relative to the source gas having the high dew point and the small volume of water vapor in a state where the desulfurizing agent is arranged in the high temperature environment. The sulfur adsorption capacity of the desulfurizing agent relative to the source gas having the low dew point and the small volume of water vapor is of course appropriately ensured.

First Embodiment

A first embodiment will be explained with reference to FIG. 1. A fuel cell system according to the first embodiment includes a fuel cell 1, a cathode gas passage 70, a reformer 2A, a source gas passage 6, an anode gas passage 73, and an insulated wall 19. The fuel cell 1 includes an anode 10 and a cathode 11. The cathode gas passage 70 supplies a cathode gas (i.e., an oxygen containing gas such as air) to the cathode 11 of the fuel cell 1. The reformer 2A reforms a source gas (gas) and generates an anode gas (i.e., a hydrogen containing gas or a hydrogen gas). The source gas passage 6 includes a pump 60 functioning as a gas supply source so as to supply the source gas in a desulfurized state to the reformer 2A. The anode gas passage 73 supplies the anode gas generated at the reformer 2A to the anode 10 of the fuel cell 1. The anode gas passage 73, the reformer 2A, and the fuel cell 1 are accommodated within the insulated wall 19. A power generation module 18 includes the reformer 2A, the fuel cell 1, and the insulated wall 19. A water supply passage 8 supplying water or water vapor for reforming the source gas is connected to the reformer 2A.

As illustrated in FIG. 1, the source gas passage 6 includes a cutoff valve 69, the first desulfurizer 100 operating in a relatively higher temperature and which accommodates the first desulfurizing agent, the second desulfurizer 200 operating in a relatively lower temperature than the first desulfurizer 100 and which accommodates a second desulfurizing agent, and a flowmeter 300 measuring a flow rate of the source gas flowing through the first desulfurizer 100 and the second desulfurizer 200. The first desulfurizer 100, the second desulfurizer 200, and the flowmeter 300 are serially arranged in the aforementioned order from an upstream side to a downstream side of the source gas passage 6 in view of a flow direction of the source gas, i.e., from the cutoff valve 69 to the power generation module 18. Specifically, the cutoff valve 69, a dew point meter 510, the first desulfurizer 100, the second desulfurizer 200, and the flowmeter 300 are arranged in the aforementioned order from the upstream side to the downstream side of the source gas passage 6. The first desulfurizer 100 is arranged in a first environment having the relatively higher temperature (i.e., in a temperature range from 50° C. to 200° C., 50° C. to 200° C. being inclusive). Specifically, the first desulfurizer 100 is arranged next to the insulated wall 19 in a state where the first desulfurizer 100 is in contact with or close to an outer wall surface of the insulated wall 19 so as to receive heat (heat conduction or radiation heat) from the insulated wall 19 of the power generation module 18. The first desulfurizer 100 accommodates the first desulfurizing agent including a desulfurization performance relative to the source gas that has a relatively higher dew point. For example, zeolite is applied to the first desulfurizing agent. Alternatively, zeolite carrying metal such as silver and copper or a porous material such as activated carbon may be applied to the first desulfurizing agent. A mean particle size of the first desulfurizing agent may be in a range from 1 mm to 2 mm, for example, but not limited to such value.

The second desulfurizer 200 is arranged in a second environment having the relatively lower temperature (i.e., in a temperature range from 0° C. to 50° C., exclusive of 50° C.) than the first environment. At this time, the relatively lower temperature substantially corresponds to the normal temperature environment. The second desulfurizer 200 is arranged so as to be away from the power generation module 18 at a high temperature. The second desulfurizing agent of the second desulfurizer 200 includes the desulfurization performance relative to the source gas that has a relatively lower dew point. In the second desulfurizer 200, the desulfurization performance relative to the source gas having the relatively higher dew point (i.e., including a relatively greater volume of water vapor) is lower than the desulfurization performance relative to the source gas having the relatively lower dew point (i.e., including a relatively smaller volume of water vapor) (see FIG. 12). For example, zeolite is applied to the second desulfurizing agent. A mean particle size of the second desulfurizing agent may be in a range from 1 mm to 2 mm, for example, but not limited to such value. Hydrocarbon source gas is applicable to the source gas, for example.

The source gas (for example, a city gas 13A) generally has a low dew point (for example, 0° C. or less, −10° C. or less, or −20° C. or less). The water vapor contained in the source gas is small accordingly. However, due to a gas piping work or a piping condition, for example, the volume of water vapor contained in the source gas may increase so that the source gas having the high dew point (for example, +20° C. or more of the dew point) may be supplied to the reformer 2A. In such case, the desulfurizing agent deteriorates for a short time period. A sulfur compound contained in the source gas as odorant flows into the reformer 2A, for example, which results in a decrease of durability of the reformer 2A. On the other hand, the first desulfurizer 100 operating in the relatively higher temperature has the desulfurization performance relative to the source gas having the relatively higher dew point. Thus, even when the source gas having the higher dew point is supplied, the appropriate desulfurization effect is obtained. Further, the source gas having the lower dew point is normally supplied to the source gas passage 6. At this time, the second desulfurizer 200 including the desulfurization performance relative to the source gas that has the relatively lower dew point is provided in addition to the first desulfurizer 100. Therefore, an insufficiency of the desulfurization performance by the first desulfurizer 100 relative to the source gas having the relatively lower dew point is covered by the second desulfurizer 200. The desulfurization performance relative to the source gas having the lower dew point is ensured accordingly. In a case where only the first desulfurizer 100 is used for the desulfurization of the source gas having the lower dew point, following malfunction may occur. In order to solve the following malfunction, the first desulfurizer 100 and the second desulfurizer 200 may be both desirably provided. The desulfurization efficiency of the desulfurizing agent increases in association with a temperature decrease of the desulfurizing agent. Thus, in a case where the source gas having the lower dew point is desulfurized only by the first desulfurizer 100, the desulfurization efficiency is not sufficient. The malfunction where a consumption of the first desulfurizing agent of the first desulfurizer 100 excessively increases may occur accordingly. At this time, in a case where the first desulfurizer 100 and the second desulfurizer 200 are both provided, the source gas having the lower dew point is mainly desulfurized by the first desulfurizer 100 while the source gas having the higher dew point is mainly desulfurized by the second desulfurizer 200. The total consumption of the first desulfurizing agent and the second desulfurizing agent may decrease, which leads to a downsizing of the fuel cell system.

Further, in a case where the consumption of the first desulfurizing agent of the first desulfurizer 100 excessively increases as mentioned above, a heat discharge from the first desulfurizer 100 increases, which leads to an increase of a heat loss of the fuel cell system. As a result, the malfunction where a heat recovery efficiency decreases may occur. The first desulfurizing agent used in the first desulfurizer 100 is expensive compared to the desulfurizing agent used in the lower temperature environment obtained. According to the present embodiment, the first desulfurizer 100 and the second desulfurizer 200 are both provided. The source gas having the lower dew point is mainly desulfurized by the first desulfurizer 100 while the source gas having the higher dew point is mainly desulfurized by the second desulfurizer 200 so that the consumption of the expensive desulfurizing agent in the first desulfurizer 100 may be reduced, thereby achieving a cost reduction.

In the aforementioned configuration, the desulfurizing agent has characteristics where a hydrocarbon group (for example, methane or butane) adsorbs or desorbs, depending on the temperature, relative to the desulfurizing agent. Thus, in a case where the temperature of the desulfurizing agent changes in association with the startup/stop of the fuel cell system or a load fluctuation of the fuel cell system, for example, the hydrocarbon group serving as a major component of the source gas may adsorb or desorb relative to the desulfurizing agent in association with the temperature change of the desulfurizing agent. The degree of adsorption or desorption increases in a case where the desulfurizing agent is arranged in a high temperature range such as the first desulfurizing agent being arranged in the first desulfurizer 100. Therefore, in a case where the flowmeter 300 is arranged at the upstream side of the first and second desulfurizers 100 and 200 as in a known technique, the possible adsorption or desorption of the hydrocarbon group at the desulfurizers 100 and 200 may cause the flow rate of the source gas supplied to the reformer 2A to change or fluctuate even when the flow rate of the source gas is appropriately or securely measured at the flowmeter 300. That is, the adsorption or desorption of the hydrocarbon group at the desulfurizers 100 and 200 may cause an excess or shortage of the actual flow rate of the source gas to the reformer 2A. When the volume of the source gas becomes insufficient, the deterioration of the fuel cell system may be proceeded because of a lack of the source gas. In addition, when the volume of the source gas becomes excessive, the deterioration of the fuel cell system may be proceeded because of an abnormally high temperature. Thus, the flowmeter 300 is desirably arranged at the downstream side of the first desulfurizer 100 having characteristics where the hydrocarbon group adsorbs or desorbs, depending on the temperature, relative to the desulfurizing agent. However, in a case where the flowmeter 300 is arranged at the downstream side of the first desulfurizer 100, the source gas passing through the first desulfurizer 100 includes heat. The source gas tends to become a heat resistance temperature of the flowmeter 300 or more, which may induce a breakage of the flowmeter 300.

Therefore, according to the present embodiment, as illustrated in FIG. 1, the flowmeter 300 is arranged at the downstream side of both the first and second desulfurizers 100 and 200 at the source gas passage 6 so as to stably supply the source gas to the reformer 2A. Further, the source gas flows through the first desulfurizer 100 and then the second desulfurizer 200. Thus, the heat of the source gas passing through the first desulfurizer 100 is received by the second desulfurizer 200 at which the heat of the source gas is radiated or released. The temperature of the source gas flowing to the flowmeter 300 that is sensitive to the heat is reduced. In this case, an issue concerning the heat resistance of the flowmeter 300 may be also resolved. A heat quantity of the source gas passing through the first desulfurizer 100 is small and thus the temperature of the source gas is sufficiently reduced by the heat radiation at the second desulfurizer 200. In addition, the pump 60 which may be unlikely to generate a pulsation of the pressure of the source gas is desirably provided.

Second Embodiment

Figure 2:
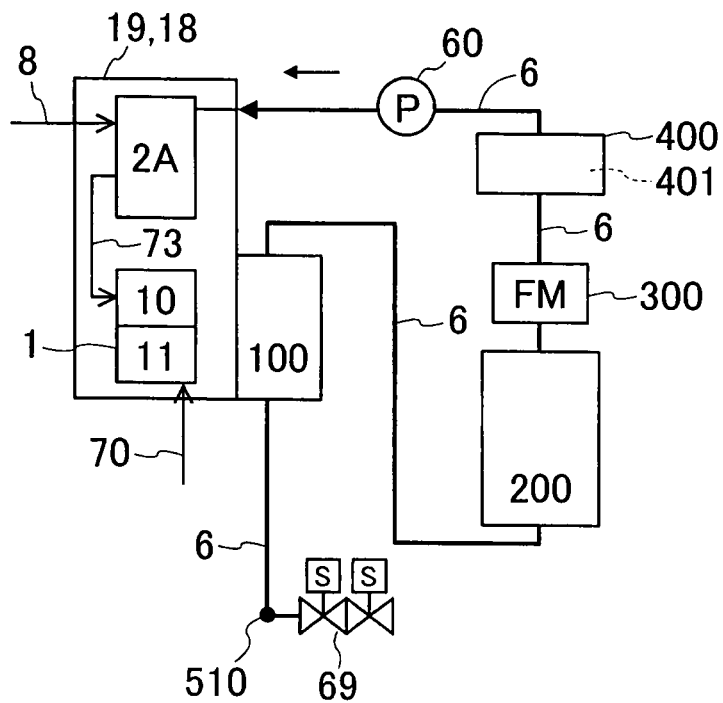
FIG. 2 is a schematic view of the fuel cell system according to a second embodiment disclosed here.

A second embodiment will be explained with reference to FIG. 2. The second embodiment basically includes the same configuration and effect as those of the first embodiment. As illustrated in FIG. 2, a buffer 400 including a buffer chamber 401 that serves as a hollow chamber is provided at the source gas passage 6. The cutoff valve 69, the first desulfurizer 100, the second desulfurizer 200, the flowmeter 300, the buffer 400, and the pump 60 are serially arranged at the source gas passage 6 from the upstream side to the downstream side thereof in the aforementioned order. The pump 60 at the source gas passage 6 supplying the source gas to the reformer 2A of the power generation module 18 may generate the pulsation of the pressure of the source gas. Therefore, the first desulfurizer 100, the second desulfurizer 200, the flowmeter 300, the buffer 400, and the pump 60 are serially arranged in the aforementioned order at the source gas passage 6 as illustrated in FIG. 2. In this case, the buffer 400 is arranged at the downstream side of the flowmeter 300 and at the upstream side of the pump 60. The flowmeter 300 is arranged immediately next to the second desulfurizer 200 at the downstream side. That is, the buffer 400 is disposed between the pump 60, which is a cause of the pulsation of the pressure of the source gas, and the flowmeter 300, which is desirably inhibited from receiving the pulsation. Therefore, the flowmeter 300 is unlikely to be influenced by the pulsation generated by the pump 60, which may lead to the stable operation of the fuel cell system. That is, because the first desulfurizer 100, the second desulfurizer 200, the flowmeter 300, the buffer 400, and the pump 60 are arranged in the aforementioned order, the pulsation generated by the pump 60 is absorbed by the buffer 400 to thereby restrain the pulsation of the flow rate of the source gas relative to the flowmeter 300. As a result, an output value of the flowmeter 300 is stabilized and a control stability of the fuel cell system is ensured. Further, the deviation of the output value of the flowmeter 300 from a true value caused by the pulsation is restrained.

Third Embodiment

Figure 3:
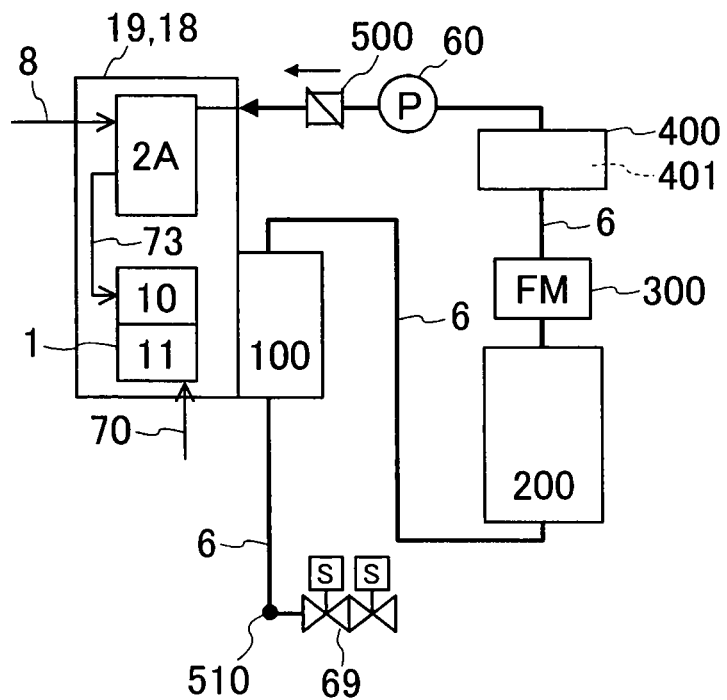
FIG. 3 is a schematic view of the fuel cell system according to a third embodiment disclosed here.

A third embodiment will be explained with reference to FIG. 3. The third embodiment basically includes the same configuration and effect as those of the first embodiment. As illustrated in FIG. 3, the first desulfurizer 100, the second desulfurizer 200, the flowmeter 300, the buffer 400, the pump 60, and a check valve 500 serving as a non-return valve are serially arranged at the source gas passage 6 from the upstream side to the downstream side thereof in the aforementioned order. As mentioned above, the pump 60 at the source gas passage 6 supplying the source gas to the reformer 2A may generate the pulsation of the pressure of the source gas. In addition, an operation of the check valve 500 may generate the pulsation of the pressure of the source gas. Therefore, the first desulfurizer 100, the second desulfurizer 200, the flowmeter 300, the buffer 400, the pump 60, and the check valve 500 are serially arranged in the aforementioned order at the source gas passage 6 as illustrated in FIG. 3. That is, the buffer 400 is disposed between the check valve 500 (and the pump 60) and the flowmeter 300. As a result, because the buffer 400 is disposed between the check valve 500 (and the pump 60) and the flowmeter 300, the flowmeter 300 may be inhibited from being influenced by the pulsation caused by the pump 60 and the check valve 500. In this case, the accuracy of the flowmeter 300 to measure the flow rate of the source gas is ensured, which may lead to the stable operation of the fuel cell system.

As illustrated in FIG. 3, the first desulfurizer 100, the second desulfurizer 200, the flowmeter 300, the buffer 400, the pump 60 for pressurization, and the check valve 500 are serially arranged at the source gas passage 6 in the aforementioned order. The first desulfurizer 100 is arranged next to the insulated wall 19 of the power generation module 18 in a state where the first desulfurizer 100 is in contact with or close to the outer wall surface of the insulated wall 19 so as to be maintained in a predetermined temperature range (for example, in a range from 60° C. to 200° C. or from 60° C. to 150° C.). The second desulfurizer 200 is arranged in a relatively lower temperature environment (for example, in the temperature range from 0° C. to 50° C., 50° C. being exclusive) in a housing (a case) of the fuel cell system so as to be away from the power generation module 18. At this time, the source gas flows through the first desulfurizer 100 to thereby increase the temperature of the source gas, the source gas then being supplied to the second desulfurizer 200. Because the heat quantity of the source gas is a few watts, the temperature of a portion of the second desulfurizer 200 at the upstream side slightly increases. At this time, the temperature of the source gas decreases to a value equal to an inner temperature (for example, 20° C. to 50° C.) of the housing (the case) of the fuel cell system by means of the heat radiation at the second desulfurizer 200. The source gas of which temperature decreases to the inner temperature of the housing is sent to the flowmeter 300, the buffer 400, the check valve 500, and the reformer 2A of the power generation module 18. As a result, the temperature of the source gas flowing to the flowmeter 300 turns to a value below 50° C. or 40° C. The temperature of the source gas is equal to or smaller than the heat resistance temperature of the flowmeter 300 and therefore the fuel cell system is operated without the breakage of the flowmeter 300.

In the first desulfurizer 100, the adsorption or the desorption of the hydrogen group may occur depending on the temperature change of the first desulfurizing agent at the first desulfurizer 100 from the startup to the stop of the fuel cell system. In this case, according to the present embodiment, the flowmeter 300 is arranged at the downstream side of the first and second desulfurizers 100 and 200, thereby accurately obtaining the flow rate of the source gas flowing to the power generation module 18 (i.e., the source gas where the adsorption or desorption of the hydrogen group is completed). The deterioration of the fuel cell system due to a shortage of supply of the source gas to the power generation module 18 is restrained.

Fourth Embodiment

Figure 4:
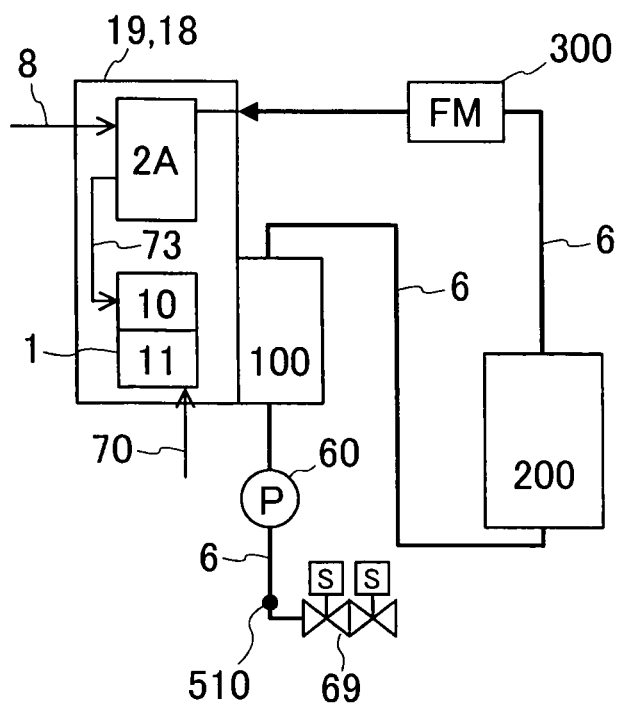
FIG. 4 is a schematic view of the fuel cell system according to a fourth embodiment disclosed here.

A fourth embodiment will be explained with reference to FIG. 4. The fourth embodiment basically includes the same configuration and effect as those of the first embodiment. As illustrated in FIG. 4, the pump 60, the first desulfurizer 100, the second desulfurizer 200, and the flowmeter 300 are serially arranged at the source gas passage 6 from the upstream side to the downstream side thereof in the aforementioned order. That is, the pump 60 is arranged at the upstream side of the first and second desulfurizers 100 and 200. The pump 60 may generate the pulsation of the pressure of the source gas. Thus, the pump 60 is provided at the upstream side of the first desulfurizer 100. At this time, the first and second desulfurizers 100 and 200 disposed between the pump 60 and the flowmeter 300 function as the buffer for restraining the pulsation. Accordingly, because the first and second desulfurizers 100 and 200 each function as the buffer while exercising the desulfurization performance, the exclusive buffer is not necessary, which results in a downsizing and a cost reduction of the fuel cell system. At this time, in a case where the pulsation of the flow rate of the source gas relative to the flowmeter 300 occurs due to the pump 60, the controllability of the fuel cell system decreases and also an absolute value (output value) of the flowmeter 300 deviates from the true value. The flow rate of the source gas supplied to the reformer 2A may be excessive or short, which may be the cause of the deterioration of the fuel cell system.

Fifth Embodiment

Figure 5:
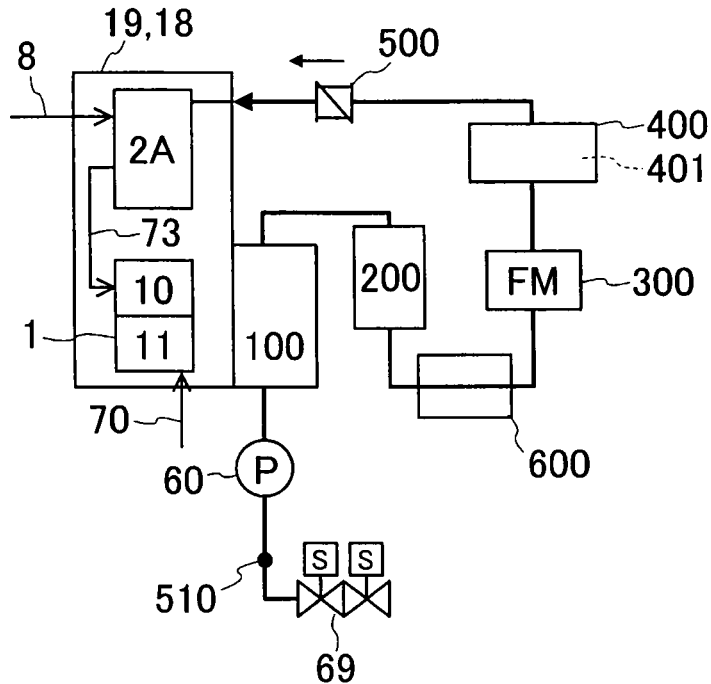
FIG. 5 is a schematic view of the fuel cell system according to a fifth embodiment disclosed here.

A fifth embodiment will be explained with reference to FIG. 5. The fifth embodiment basically includes the same configuration and effect as those of the fourth embodiment. As illustrated in FIG. 5, the pump 60, the first desulfurizer 100, the second desulfurizer 200, a cooling portion 600, and the flowmeter 300 are serially arranged at the source gas passage 6 from the upstream side to the downstream side thereof in the aforementioned order. The pump 60 may generate the pulsation of the pressure of the source gas. Therefore, the pump 60 is arranged at the upstream side of the first desulfurizer 100 so as to separate the pump 60 from the flowmeter 300. At this time, the first and second desulfurizers 100 and 200 disposed between the pump 60 and the flowmeter 300 each function as the buffer for restraining the pulsation, thereby eliminating the necessity of providing the exclusive buffer. In addition, even when the flowmeter 300 is weak against heat, the heat of the source gas passing through the first desulfurizer 100 is discharged at the second desulfurizer 200 and the cooling portion 600, thereby cooling the source gas. The source gas at the low temperature is supplied to the flowmeter 300 so that the flowmeter 300 is protected from the heat. Because the buffer 400 is disposed between the check valve 500 and the flowmeter 300, the operation of the check valve 500 is inhibited from influencing the flowmeter 300. The cooling portion 600 may be achieved by a radiation fin, receiving a cooling air, or a heat exchange with a cooling water, for example.

Reference Embodiment

Figure 6:
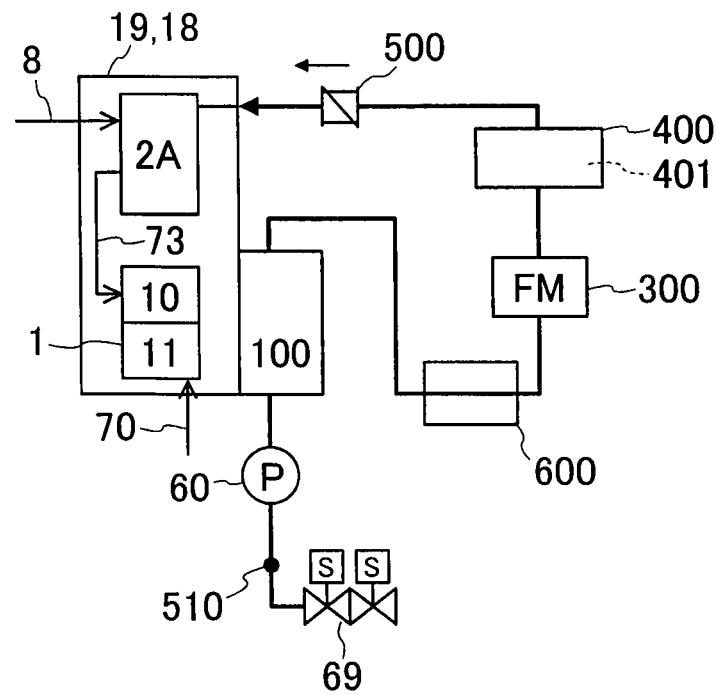
FIG. 6 is a schematic view of the fuel cell system according to a reference embodiment of the fifth embodiment disclosed here.

A reference embodiment will be explained with reference to FIG. 6. The reference embodiment basically includes the same configuration and effect as those of the fifth embodiment. As illustrated in FIG. 6, the first desulfurizer 100 is provided, however, the second desulfurizer 200 is not provided. The cutoff valve 69, the pump 60, the first desulfurizer 100, the cooling portion 600, and the flowmeter 300 are serially arranged in the aforementioned order at the source gas passage 6. The cooling portion 600 is disposed between the first desulfurizer 100 and the flowmeter 300. The cooling portion 600 may be achieved by a radiation fin, receiving a cooling air, or a heat exchange with a cooling water, for example. The flowmeter 300 is weak against heat, however, the heat of the source gas passing through the first desulfurizer 100 is discharged at the cooling portion 600, thereby cooling the source gas. The flowmeter 300 may be protected from heat accordingly. In addition, because the flowmeter 300, the buffer 400, and the check valve 500 are arranged in the aforementioned order at the source gas passage 6, the flowmeter 300 is unlikely to be influenced by the pulsation even when the pump 60 generates the pulsation.

Sixth Embodiment

Figure 7:
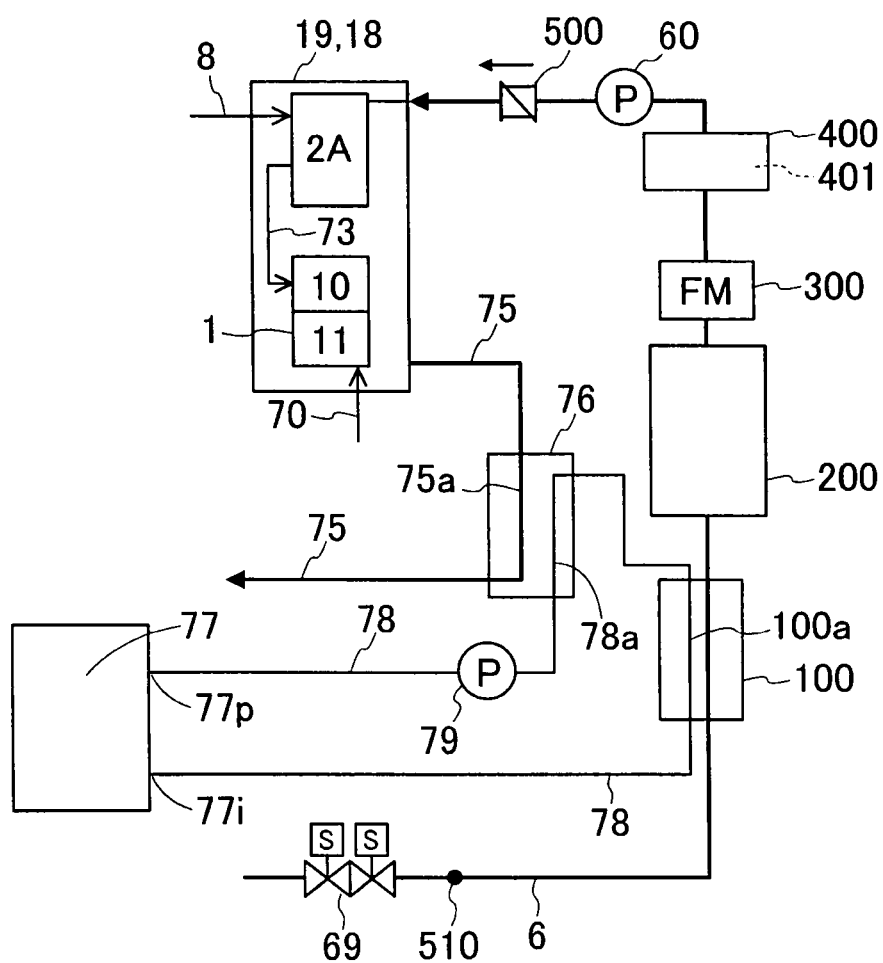
FIG. 7 is a schematic view of the fuel cell system according to a sixth embodiment disclosed here.

A sixth embodiment will be explained with reference to FIG. 7. The sixth embodiment basically includes the same configuration and effect as those of the first embodiment. As illustrated in FIG. 7, the first desulfurizer 100, the second desulfurizer 200, the flowmeter 300, the buffer 400, the pump 60, and the check valve 500 are serially arranged at the source gas passage 6 from the upstream side to the downstream side thereof, i.e., from the cutoff valve 69 to the power generation module 18, in the aforementioned order. In addition, a hot water passage 78 and a hot water storage tank 72 are provided. A hot water heated by the heat exchange with an exhaust gas that is generated upon a power generating operation of the fuel cell system flows through the hot water passage 78. A hot water storage tank 77 connected to the hot water passage 78 stores the hot water supplied from the hot water passage 78. A hot water pump 79 is provided at the hot water passage 78. The exhaust gas discharged from the reformer 2A or the fuel cell 1 of the power generation module 18 is emitted to the outside from an exhaust gas passage 75 via a passage 75a of a heat exchanger 76 for exhaust. In a case where the hot water pump 79 is operated, the water in the hot water storage tank 77 flows from a discharge port 77p of the hot water storage tank 77 through an outward passage 78a of the heat exchanger 76. The water then receives heat from the exhaust gas at the high temperature flowing through the exhaust gas passage 75 and flows through a passage 100a of the first desulfurizer 100 so as to be returned to the hot water storage tank 77 from a return port 77i. The water in the hot water storage tank 77 turns to the hot water accordingly. Because the hot water flows through the passage 100a of the first desulfurizer 100, the first desulfurizer 100 is heated to a temperature range from 50° C. to 95° C., for example. The first desulfurizer 100 is arranged in a temperature environment so that the first desulfurizer 100 receives heat from at least one of the hot water passage 78 and the hot water storage tank 77. Because of the heat exchange with the hot water (generally at 70° C. to 95° C.), the temperature of the first desulfurizer 100 may be maintained at an appropriate temperature. Further, because the heat quantity of the water in the hot water passage 78 is large, a temperature distribution within the first desulfurizer 100 may decrease. As a result, the consumption of the first desulfurizing agent accommodated in the first desulfurizer 100 may be reduced.

Seventh Embodiment

Figure 8:
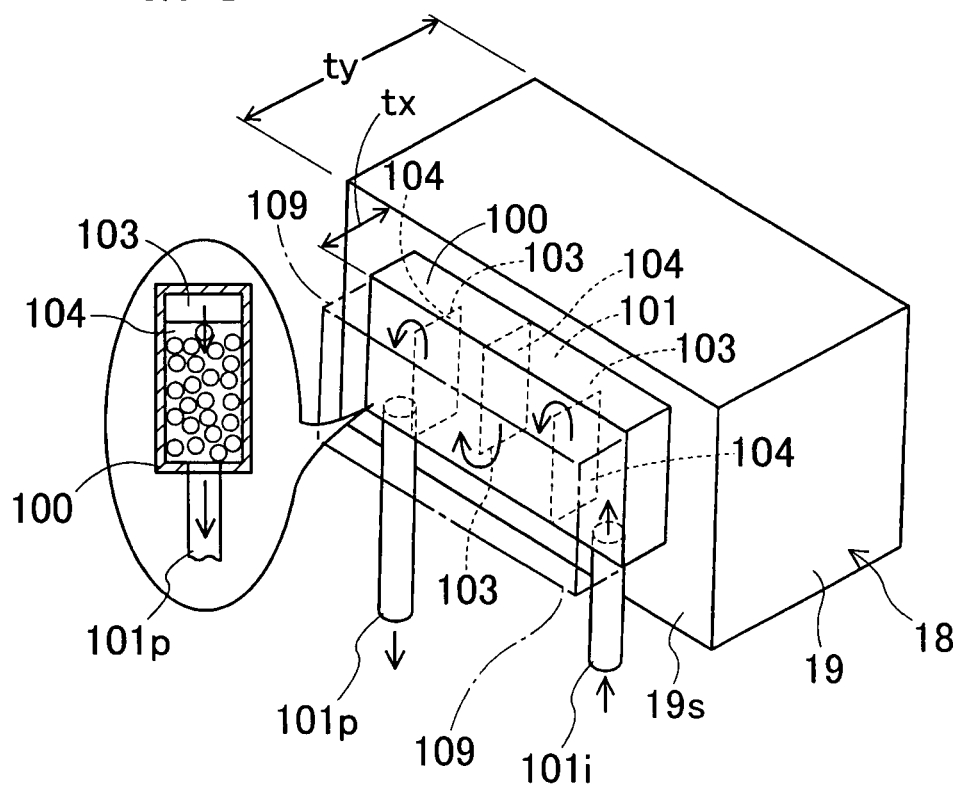
FIG. 8 is a schematic view of a first desulfurizer arranged next to a power generation module according to a seventh embodiment disclosed here.

A seventh embodiment will be explained with reference to FIG. 8. As illustrated in FIG. 8, the first desulfurizer 100 operating in the relatively higher temperature is attached so as to be thermally in contact with a surface 19s of the insulated wall 19 of the power generation module 18 (serving as a heat source) by an attachment member. Alternatively, the first desulfurizer 100 may be attached to an upper surface or a lower surface of the insulated wall 19. The first desulfurizing agent having a grain shape and including the zeolite-base porous material is accommodated in a desulfurization chamber 101 of the first desulfurizer 100. The heat of the power generation module 18 is transmitted to the first desulfurizer 100 by thermal conduction or by thermal radiation. As illustrated in FIG. 8, the desulfurization chamber 101 of the first desulfurizer 100 is partitioned by plural partition plates 104 into plural portions. The partition plates 104 form plural opening portions 103 in the desulfurization chamber 101. The source gas flowing from an inlet port 1011 of the desulfurization chamber 101 flows through the plural opening portions 103 by winding plural times so as to trace U-shapes along the partition plates 104 in the vertical direction of FIG. 8. As a result, the source gas secures a distance in which the source gas is desulfurized by the desulfurizing agent. Afterward, the source gas is discharged through an outlet port 101p of the desulfurization chamber 101 therefrom to the reformer 2A. A thickness tx of the first desulfurizer 100 in a direction perpendicular to the vertical direction in FIG. 8 is shorter than a thickness ty of the power generation module 18 in the direction perpendicular to the vertical direction in FIG. 8. In addition, the first desulfurizer 100 is formed of a flattened box. Therefore, the first desulfurizer 100 may secure a large area by which the heat from the surface 19s of the insulated wall 19 is received. Temperature variations of the first desulfurizing agent accommodated in the first desulfurizer 100 may be reduced. The insulated wall 19 of the power generation module 18 may not be appropriately heated in a case where the operation of the fuel cell system is stopped in a long period of time, for example. Then, as illustrated in FIG. 8, an electric heater 109 may be attached to an outer wall surface of the first desulfurizer 100. When the fuel cell system is started, the electric heater 109 is turned on to heat the first desulfurizing agent in the first desulfurizer 100, thereby bringing the first desulfurizing agent in a temperature environment equal to or greater than 50° C. After the insulated wall 19 reaches the high temperature equal to or greater than 50° C., the electric heater 109 may be turned off. In each of the aforementioned embodiments, the electric heater 109 may be provided at the first desulfurizer 100 operating in the relatively higher temperature.

Eighth Embodiment

Figure 9:
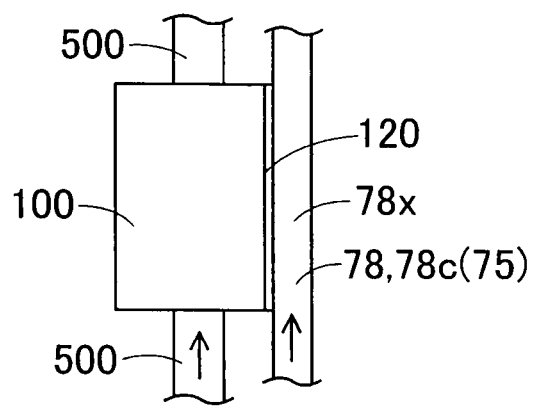
FIG. 9 is a schematic view of the first desulfurizer according to an eighth embodiment disclosed here.

An eighth embodiment will be explained with reference to FIG. 9. As illustrate in FIG. 9, the first desulfurizer 100 operating in the relatively higher temperature and accommodating the first desulfurizing agent that includes the porous material as the base material is arranged next to a pipe 78x forming an inward passage 78c of the hot water passage 78 through which the hot water flows. Specifically, the first desulfurizer 100 extends side by side with the pipe 78x while making contact with the pipe 78x via a contact portion 120 serving as a welding portion or brazed portion, for example. The first desulfurizer 100 is heated to 50° C. or higher by heat of the hot water (at a temperature from 50° C. to 95° C., for example) flowing in the hot water passage 78. The first desulfurizer 100 may be heated by the combustion gas passage 75, instead of the pipe 78x, through which the hot exhaust gas emitted from the reformer 2A or the fuel cell 1 flows.

Ninth Embodiment

A ninth embodiment will be explained with reference to FIG. 10. As illustrated in FIG. 10, the pipe 78x forming the inward passage 78c of the hot water passage 78 through which the hot water flows is spirally wound around the first desulfurizer 100 operating in the relatively higher temperature and accommodating the first desulfurizing agent. The first desulfurizer 100 is heated to 50° C. or higher by heat of the hot water (at a temperature from 50° C. to 95° C., for example) flowing in the hot water passage 78. The first desulfurizer 100 may be heated by the combustion gas passage 75, instead of the pipe 78x, through which the hot exhaust gas emitted from the reformer 2A or the fuel cell 1 flows.

Figure 11:
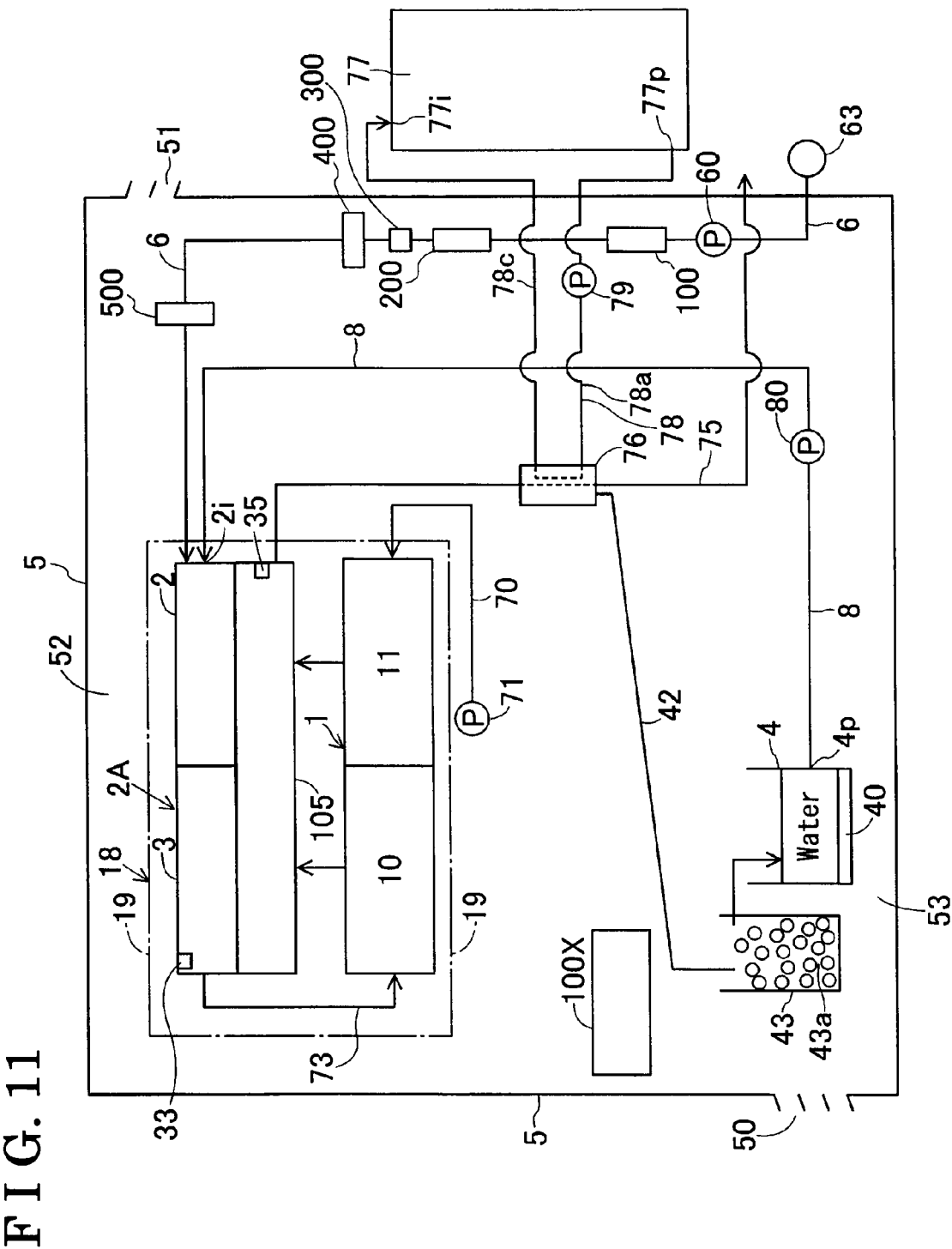
FIG. 11 is a schematic view of the fuel cell system according to first to ninth embodiments.

An example of the application of the fuel cell system according to the aforementioned embodiments will be explained with reference to FIG. 11. As illustrated in FIG. 11, the fuel cell system includes the fuel cell 1, an evaporating portion 2 evaporating water in a liquid phase so as to generate water vapor, a reforming portion 3 reforming fuel (source gas) by using the water vapor generated at the evaporating portion 2 so as to form anode gas, a tank 4 storing the water supplied to the evaporating portion 2, and a case 5 accommodating the fuel cell 1, the evaporating portion 2, the reforming portion 3, and the tank 4. The fuel cell 1 includes the anode 10 and the cathode 11 sandwiching therein an ionic conductor. For example, a solid oxide fuel cell (SOFC; an operation temperature is equal to or greater than 400° C., for example) is applicable to the fuel cell 1. The reforming portion 3 is formed by a carrier such as ceramics on which a reforming catalyst is carried. The reforming portion 3 is arranged next to the evaporating portion 2 so as to constitute the reformer 2A together with the evaporating portion 2. The reformer 2A and the fuel cell 1 are surrounded by the insulated wall 19 to thereby form the power generation module 18. A temperature sensor 33 detecting a temperature of the reforming portion 3 is provided at an inner side of the reforming portion 3. In addition, an ignition portion 35 serving as a heater for igniting the fuel is provided at an inner side of a combusting portion 105. The ignition portion 35 may have any structure as long as the ignition portion 35 ignites the fuel in the combusting portion 105. A signal from the temperature sensor 33 is input to a control portion 100x.

In the power generating operation of the fuel cell system (the fuel cell 1), the reformer 2A is heated up within the insulated wall 19 so as to be suitable for a reforming reaction. In the power generating operation, the evaporating portion 2 is heated up so as to heat the water to obtain the water vapor. In a case where the fuel cell 1 is the SOFC, the anode exhaust gas discharged from the anode 10 and the cathode exhaust gas discharged from the cathode 11 are burnt at the combusting portion 105. As a result, the reforming portion 3 and the evaporating portion 2 are heated up at the same time within the power generation module 18. The source gas passage 6 through which the source gas is supplied from a fuel source 63 to the reformer 2A includes the pump 60, the first desulfurizer 100, the second desulfurizer 200, the flowmeter 300, and the check valve 500.

FIG. 11 simply illustrates an example of a schematic layout of the fuel cell system. In particular, the first desulfurizer 100 accommodates the first desulfurizing agent where the zeolite-base porous material including metal such as silver serves as the base material. The first desulfurizer 100 is arranged to be in contact with the insulated wall 19 of the power generation module 18 so that a heat transfer is obtained from the insulated wall 19 to the first desulfurizer 100. In the operation of the fuel cell system, the first desulfurizer 100 receives heat from the insulated wall 19 of the power generation module 18 (the heat source) so as to be heated to a high temperature range from 50° C. to 230° C. (inclusive of 50° C. and 230° C.). The second desulfurizer 200 accommodates the second desulfurizing agent where a zeolite porous material serves as the base material. The second desulfurizer 200 is arranged to be away from the insulated wall 19 so that the second desulfurizer 200 is arranged in the normal temperature range (i.e., the temperature range from 0° C. to 50° C., exclusive of 50° C.). The cathode gas passage 70 is connected to the cathode 11 of the fuel cell 1 so as to supply the cathode gas (air) to the cathode 11. A cathode pump 71 is provided at the cathode gas passage 70 so as to function as a supply source transmitting the cathode gas.

As illustrated in FIG. 11, the case 5 includes an intake port 50 and an exhaust port 51 connected to an outside air. Further, the case 5 includes an upper void 52 provided at an upper side of the case 5 and serving as a first chamber and a lower void 53 provided at a lower side of the case 5 and serving as a second chamber. The fuel cell 1, the reforming portion 3, the evaporating portion 2, and the combusting portion 105 heating the evaporating portion 2 and the reforming portion 3 are accommodated in the upper void 52. The tank 4 storing the water to be reformed at the reforming portion 3 is accommodated in the lower void 53. A heating portion 40 such as an electric heater having a heating function is provided at the tank 4. The heating portion 40 formed by the electric heater, for example, heats up the water stored in the tank 4. In a case where an ambient temperature such as an outside air temperature is low, the water in the tank 4 is heated up to or above a predetermined temperature (for example, 5° C., 10° C., or 20° C.) by the heating portion 40 based on a command from the control portion 100x to thereby avoid freezing. As illustrated in FIG. 11, the water supply passage 8 serving as a conduit is provided within the case 5 so as to connect an outlet port 4p of the tank 4 in the lower void 53 to an inlet port 21 of the evaporating portion 2 in the upper void 52. Because the tank 4 is arranged at a lower side of the evaporating portion 2 within the case 5, the water supply passage 8 basically and substantially extends in a vertical direction. The water supply passage 8 is a passage through which the water stored in the tank 4 is supplied therefrom to the evaporating portion 2. A pump 80 functioning as a water supply source is provided at the water supply passage 8 so as to send the water in the tank 4 to the evaporating portion 2. The control portion 100x is provided to control the pump 80. Further, the control portion 100x controls the pumps 71, 79, and 60.

In a case where the pump 80 is driven in the operation of the fuel cell system, the water in the tank 4 is sent from the outlet port 4p of the tank 4 to the inlet port 2i of the evaporating portion 2 through the water supply passage 8. The water is then heated at the evaporating portion 2 to form the water vapor. The water vapor moves and flows together with the source gas supplied from the source gas passage 6 to the reforming portion 3. The source gas (fuel) in the reforming portion 3 is reformed by the water vapor so as to form the anode gas (the hydrogen containing gas). In a case where the source gas is a methane gas, the generation of the anode gas by the reforming using the water vapor is considered to occur on a basis of a formula (I) below. At this time, however, the source gas is not limited to the methane gas.

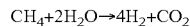

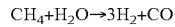
(1)

The anode gas generated at the reforming portion 3 is supplied to the anode 10 of the fuel cell 1 via the anode gas passage 73. Further, the cathode gas (the oxygen containing gas, i.e., air in the case 5) is supplied to the cathode 11 of the fuel cell 1 via the cathode gas passage 70. As a result, the fuel cell 1 generates an electric power. The exhaust gas at the high temperature emitted at the fuel cell 1 is discharged to the outside of the case 5 via the exhaust gas passage 75.

The heat exchanger 76 having a condensation function is provided at the exhaust gas passage 75. The hot water passage 78 connected to the hot water storage tank 77 is connected to the heat exchanger 76. The hot water pump 79 is provided at the hot water passage 78. The hot water passage 78 includes the outward passage 78a and the inward passage 78c. A low temperature water in the hot water storage tank 77 is discharged from the discharge port 77p of the hot water storage tank 77 by the driving of the hot water pump 79 so as to flow through the outward passage 78a and is heated at the heat exchanger 76 by a heat exchange function thereof. The water heated by the heat exchanger 76 is returned to the hot water storage tank 77 from the return port 77i by flowing through the inward passage 78c. Accordingly, the hot water is obtained at the hot water storage tank 77. The water vapor included in the aforementioned exhaust gas from the fuel cell 1 is condensed at the heat exchanger 76 to form condensed water. The condensed water is supplied to a purification portion 43 due to the effect of gravity, for example, via a condensation water passage 42 extending from the heat exchanger 76. Because the purification portion 43 includes a water purifier 43a such as an ion-exchange resin, an impure substance contained in the condensed water is removed. The water where the impure substance is removed moves to the tank 4 and is stored thereat. When the pump 80 is driven, the water in the tank 4 is supplied to the evaporating portion 2 at the high temperature via the water supply passage 8 and is then supplied to the reforming portion 3 after the water turns to the water vapor at the evaporating portion 2. The water (water vapor) is consumed at the reforming portion 3 in the reforming reaction for reforming the fuel.

The first to ninth embodiments are not limited to have the aforementioned structures and applications and may be appropriately modified. The fuel cell 1 is not limited to the SOFC and may be a polymer electrolyte fuel cell (PEFC), a phosphoric acid fuel cell (PAFC), or a molten carbonate fuel cell (MCFC). The fuel cell system at least includes a configuration where the first desulfurizer 100 and the second desulfurizer 200 where the source gas is desulfurized are serially arranged. The source gas may be gas including a sulfur compound such as city gas, propane gas, biogas, liquefied petroleum gas (LPG), and compressed natural gas (CNG). The first desulfurizer 100 may be a desulfurizer where the source gas is desulfurized by an addition of hydrogen. The fuel cell system at least includes the configuration where the first desulfurizer 100, the second desulfurizer 200, and the flowmeter 300 are arranged at the source gas passage 6 in the aforementioned order.

The fuel cell system according to the aforementioned embodiments includes the fuel cell 1 having the anode 10 and the cathode 11, the cathode gas passage 70 supplying the cathode gas to the cathode 11 of the fuel cell 1, the reforming portion 3 reforming the source gas so as to form the anode gas, the source gas passage 6 including the pump 60 that supplies the source gas in the desulfurized state to the reforming portion 3, and the anode gas passage 73 supplying the anode gas generated at the reforming portion 3 to the anode 10 of the fuel cell 1. The source gas passage 6 includes the first desulfurizer 100 arranged in the relatively higher temperature environment and accommodating the desulfurizing agent that has the desulfurization performance relative to the source gas having the relatively higher dew point. Accordingly, the aforementioned fuel cell system is effective for the source gas having the relatively higher dew point because the fuel cell system is unlikely to be damaged by the source gas having the relatively higher dew point.

In addition, the cutoff valve 69, the pump 60, the first desulfurizer 100, the cooling portion 600, and the flowmeter 300 are serially arranged at the source gas passage 6 in the aforementioned order. The cooling portion 600 is disposed between the first desulfurizer 100 and the flowmeter 300. The flowmeter 300 is sensitive to heat. Thus, the heat of the source gas flowing and passing through the first desulfurizer 100 operating in the relatively higher temperature is radiated at the cooling portion 600 to thereby cool the source gas. The flowmeter 300 may be protected from heat accordingly.

According to the aforementioned first to ninth embodiments, in a case where the source gas having the relatively lower dew point and the small volume of water vapor is desulfurized, and in a case where the source gas having the relatively higher dew point and the large volume of water vapor is desulfurized, the sulfur compound contained in the source gas is appropriately desulfurized. In addition, heat of the source gas flowing and passing through the first desulfurizer 100 is received by the second desulfurizer 200 and is radiated thereat. Therefore, the temperature of the source gas flowing to the flowmeter 300 arranged at the downstream side of the second desulfurizer 200 is reduced. An issue of a heat resistance of the flowmeter 300 is restrained, thereby improving a lifetime of the flowmeter 300.

According to the aforementioned second and third embodiments, the source gas passage 6 includes the buffer 400 having the buffer chamber 401. The first desulfurizer 100, the second desulfurizer 200, the flowmeter 300, the buffer 400, and the pump 60 are arranged at the source gas passage 6 in a state where the arrangement order is the first desulfurizer 100, the second desulfurizer 200, the flowmeter 300, the buffer 400, and the pump 60 from the upstream side to the downstream side of the source gas passage 6 in the flow direction of the source gas.

Because the first desulfurizer 100, the second desulfurizer 200, the flowmeter 300, the buffer 400, and the pump 60 are serially arranged in the aforementioned order, the buffer 400 is disposed between the flowmeter 300 and the pump 60 so as to buffer the pulsation of the pressure of the source gas. Thus, the flowmeter 300 is restrained from being influenced by the pulsation caused by the pump 60, which leads to a stable operation of the fuel cell system.

According to the aforementioned fourth and fifth embodiments, the pump 60, the first desulfurizer 100, the second desulfurizer 200 and the flowmeter 300 are arranged at the source gas passage 6 in a state where the arrangement order is the pump 60, the first desulfurizer 100, the second desulfurizer 200 and the flowmeter 300 from the upstream side to the downstream side of the source gas passage 6 in the flow direction of the source gas.

Accordingly, the first desulfurizer 100 and the second desulfurizer 200 function as the buffer so that the exclusive buffer is not required, which may result in a downsizing and a cost decrease of the fuel cell system.

According to the aforementioned sixth, seventh and ninth embodiments, the first desulfurizer 100 receives heat from one of the insulated wall 19 covering at least one of the reformer 2A and the fuel cell 1, and the exhaust gas passage 75 through which an exhaust gas emitted from the reformer 2A flows.

Accordingly, without the excessive decrease of the heat recovery efficiency, the first desulfurizer 100 is maintained in the appropriate high temperature environment. The function of the first desulfurizer 100 (i.e., the appropriate desulfurization performance relative to the source gas having the relatively higher dew point) is appropriately exercised accordingly.

According to the aforementioned sixth, seventh and ninth embodiments, the fuel cell system further includes the hot water passage 78 through which the hot water heated by the power generating operation of the fuel cell system flows, and the hot water storage tank 77 connected to the hot water passage 78 and storing the hot water supplied from the hot water passage 78. The first desulfurizer 100 is arranged in the temperature environment so as to receive heat from at least one of the hot water passage 78 and the hot water storage tank 77.

Accordingly, the temperature of the first desulfurizer 100 may be maintained at the appropriate temperature because of the heat exchange with the hot water. Further because the heat quantity of water in the hot water passage 78 is large, the temperature distribution within the first desulfurizer 100 may decrease. As a result, the consumption of the first desulfurizing agent accommodated in the first desulfurizer 100 may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A fuel cell system comprising:
a fuel cell including an anode and a cathode;
a cathode gas passage supplying a cathode gas to the cathode of the fuel cell;
a reformer reforming a source gas to generate an anode gas;
a source gas passage including a gas supply source that supplies the source gas in a desulfurized state to the reformer; and
an anode gas passage supplying the anode gas generated at the reformer to the anode of the fuel cell;
a first desulfurizer arranged in the gas source passage, the first desulfurizer operating in a first environment;
a second desulfurizer arranged in the gas source passage, the second desulfurizer operating in a second environment having a relatively lower temperature than the first environment; and
a flowmeter arranged in the gas source passage, the flowmeter measuring a flow volume of the source gas,
wherein the first desulfurizer, the second desulfurizer, and the flowmeter are arranged in order from an upstream side to a downstream side of the source gas passage in a flow direction of the source gas,
wherein the second desulfurizer is configured to operate at a relatively lower dew point than the first desulfurizer, and
wherein the first desulfurizer and the second desulfurizer each include a porous material.

2. The fuel cell system according to claim 1, wherein the source gas passage includes a buffer having a buffer chamber, the buffer being downstream of the flowmeter in the flow direction of the source gas.

3. The fuel cell system according to claim 1, wherein the gas supply source is upstream of the first desulfurizer in the flow direction of the source gas.

4. The fuel cell system according to claim 1, wherein an insulated wall covers at least one of the reformer and the fuel cell, and the first desulfurizer is arranged next to the insulated wall so that the first desulfurizer receives heat from the insulated wall.

5. The fuel cell system according to claim 1, further comprising:
a hot water passage through which a hot water heated by a power generating operation of the fuel cell system flows, and
a hot water storage tank connected to the hot water passage and storing the hot water supplied from the hot water passage,
wherein the first desulfurizer is arranged so as to receive heat from at least one of the hot water passage and the hot water storage tank.

6. The fuel cell system according to claim 1, further comprising:
a dew point meter arranged upstream of the first desulfurizer in the flow direction of the source gas, the dew point meter measuring a dew point of the source gas.

7. The fuel cell system according to claim 1, wherein a temperature of the first environment is equal to or greater than 50° C. and a temperature of the second environment is less than 50° C.

* * * * *